United States Patent
Reitz et al.

(10) Patent No.: US 7,464,690 B1
(45) Date of Patent: Dec. 16, 2008

(54) ADAPTIVE ENGINE INJECTION FOR EMISSIONS REDUCTION

(75) Inventors: Rolf D. Reitz, Madison, WI (US); Yong Sun, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/754,402

(22) Filed: May 29, 2007

(51) Int. Cl.
*F02B 3/00* (2006.01)
*F02B 3/04* (2006.01)

(52) U.S. Cl. .................. 123/299; 123/300
(58) Field of Classification Search .......... 123/299, 123/300, 305, 430, 295
See application file for complete search history.

(56) References Cited

U.S. PATENT DOCUMENTS

| | | | |
|---|---|---|---|
| 4,621,599 A * | 11/1986 | Igashira et al. ............. 123/300 |
| 5,117,790 A * | 6/1992 | Clarke et al. ............... 123/321 |
| 5,205,152 A * | 4/1993 | Clarke et al. ............... 73/9 |
| 5,345,916 A | 9/1994 | Amann et al. |
| 5,392,745 A | 2/1995 | Beck |
| 5,425,341 A | 6/1995 | Connolly et al. |
| 5,601,068 A | 2/1997 | Nozaki |
| 5,771,865 A | 6/1998 | Ishida |
| 5,801,308 A | 9/1998 | Hara |
| 5,832,880 A | 11/1998 | Dickey |
| 6,067,954 A * | 5/2000 | Kudou et al. ............... 123/299 |
| 6,112,721 A | 9/2000 | Kouketsu et al. |
| 6,213,086 B1 | 4/2001 | Chmela et al. |
| 6,230,683 B1 | 5/2001 | Zur Loye et al. |
| 6,378,297 B1 * | 4/2002 | Ito et al. .................... 60/284 |
| 6,378,487 B1 | 4/2002 | Zukouski et al. |
| 6,382,177 B1 * | 5/2002 | Saito ......................... 123/299 |

(Continued)

FOREIGN PATENT DOCUMENTS

EP 1077321 2/2001

(Continued)

OTHER PUBLICATIONS

Sun, Y., and Reitz, R.D., "Modeling Diesel Engine NOx and Soot Reduction with Optimized Two-Stage Combustion," SAE Technical Paper Series, 2006-01-0027 (2006).

(Continued)

*Primary Examiner*—Mahmoud Gimie
(74) *Attorney, Agent, or Firm*—Craig A. Fieschko, Esq.; DeWitt Ross & Stevens S.C.

(57) ABSTRACT

NOx and soot emissions from internal combustion engines, and in particular compression ignition (diesel) engines, are reduced by varying fuel injection timing, fuel injection pressure, and injected fuel volume between low and greater engine loads. At low loads, fuel is injected during one or more low-pressure injections occurring at low injection pressures between the start of the intake stroke and approximately 40 degrees before top dead center during the compression stroke. At higher loads, similar injections are used early in each combustion cycle, in addition to later injections which preferably occur between about 90 degrees before top dead center during the compression stroke, and about 90 degrees after top dead center during the expansion stroke (and which most preferably begin at or closely adjacent the end of the compression stroke). These later injections have higher injection pressure, and also lower injected fuel volume, than the earlier injections.

28 Claims, 1 Drawing Sheet

U.S. PATENT DOCUMENTS

| | | | |
|---|---|---|---|
| 6,425,367 B1 * | 7/2002 | Hiraya et al. | 123/299 |
| 6,434,929 B1 * | 8/2002 | Nishimura et al. | 60/278 |
| 6,526,939 B2 | 3/2003 | Reitz et al. | |
| 6,557,532 B1 * | 5/2003 | Nakayama et al. | 123/490 |
| 6,640,774 B2 | 11/2003 | Betz et al. | |
| 6,668,789 B1 | 12/2003 | Marriott et al. | |
| 6,712,036 B1 | 3/2004 | Andersson et al. | |
| 6,732,705 B2 | 5/2004 | Ebelsheiser et al. | |
| 6,736,106 B2 | 5/2004 | Reitz et al. | |
| 6,935,303 B2 | 8/2005 | Eismark et al. | |
| 7,096,853 B2 * | 8/2006 | Tomita | 123/406.47 |
| 2002/0026922 A1 | 3/2002 | Betz et al. | |
| 2004/0154582 A1 * | 8/2004 | Shimazaki | 123/299 |
| 2005/0161020 A1 * | 7/2005 | Tomita | 123/305 |

FOREIGN PATENT DOCUMENTS

| | | |
|---|---|---|
| JP | 11343912 | 12/1999 |

OTHER PUBLICATIONS

Montgomery, D.T. and Reitz, R.D. "Six-mode Cycle Evaluation of the Effect of EGR and Multiple Injections on Particulate and NOx Emissions from a D.I. Diesel Engine," SAE Paper 960316, SAE Transactions, vol. 105, Section 3, Journal of Engines, pp. 356-373 (1996).

Pierpoint, D A. , Montgomery, D.T., and Reitz, R.D., "Reducing Particulate and NOx Emissions by Using Multiple Injections and EGR in a D.I. Diesel," SAE Technical Paper Series 950217, Abstract, pp. 1-13 (1995).

Tow, T., Pierpont, A. and Reitz, R.D., "Reducing Particulates and NOx Emissions by Using Multiple Injections in a Heavy Duty D.I. Diesel Engine," SAE Technical Paper Series 940897, SAE Transactions, vol. 103, Section 3, Journal of Engines, pp. 1403-1417 (1994).

Tanabe, K., Kohketsu, S., and Nakayama, S., "Effect of Fuel Injection Rate Control on Reduction of Emissions and Fuel Consumption in a Heavy Duty DI Diesel Engine," SAE Document No. 2005-01-0907 (2005).

\* cited by examiner

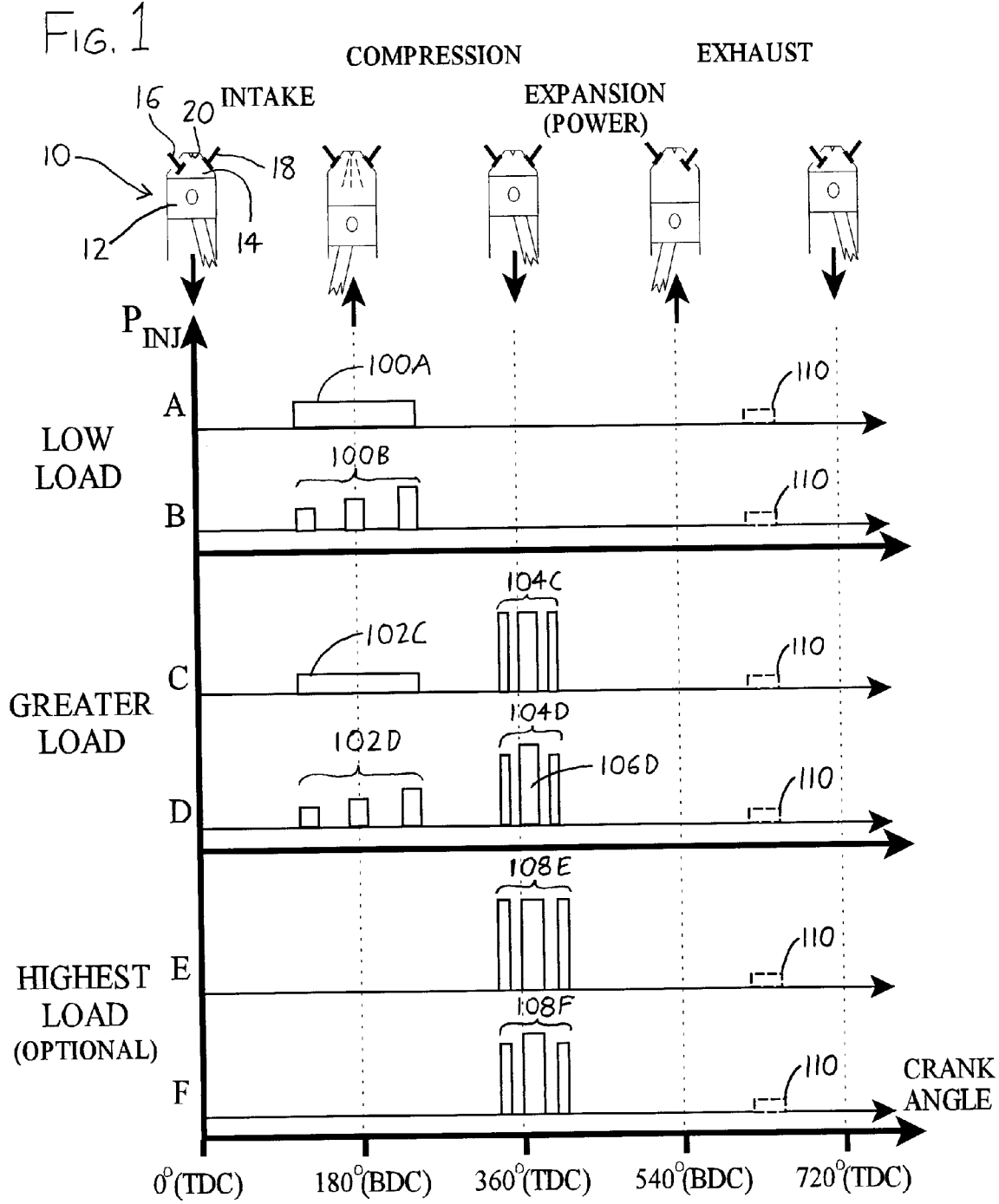

ADAPTIVE ENGINE INJECTION FOR EMISSIONS REDUCTION

STATEMENT REGARDING FEDERALLY SPONSORED RESEARCH

This invention was made with United States government support awarded by the following agencies:

U.S. Department of Energy (DOE) Grant No.: DE-FC26-06NT42628 The United States has certain rights in this invention.

FIELD OF THE INVENTION

This document concerns an invention relating generally to methods and devices for reducing emissions from internal combustion engines, and more specifically to methods and apparata for reducing soot and $NO_x$ emissions from internal combustion engines (and in particular diesel engines).

BACKGROUND OF THE INVENTION

Common pollutants arising from the use of internal combustion engines are nitrogen oxides (commonly denoted $NO_x$) and particulate matter (also known simply as "soot"). $NO_x$ is generally associated with high-temperature engine conditions, and may be reduced by use of measures such as exhaust gas recirculation (EGR), wherein the engine intake air is diluted with relatively inert exhaust gas (generally after cooling the exhaust gas). This reduces the oxygen in the combustion regime and reduces the maximum combustion temperature, thereby deterring $NO_x$ formation. Soot includes a variety of matter such as elemental carbon, heavy hydrocarbons, hydrated sulfuric acid, and other large molecules, and are generally associated with non-optimal combustion. Soot can be reduced by increasing combustion and/or exhaust temperatures, or by providing more oxygen to promote oxidation of the soot particles. Unfortunately, measures which reduce $NO_x$ tend to increase soot emissions, and measures which reduce soot tend to increase $NO_x$ emissions, resulting in what is often termed the "soot-$NO_x$ tradeoff".

At the time of this writing, the diesel engine industry is facing stringent emissions legislation in the United States, and is struggling to find methods to meet government-imposed $NO_x$ and soot restrictions. One measure under consideration is use of exhaust after-treatment (e.g., particulate traps) for soot emissions control in both heavy-duty truck and automotive diesel engines. However, in order to meet mandated durability standards (e.g., 50,000 to 100,000 miles), the soot trapped must be periodically re-burned. This requires considerable expense and complexity, particularly since additional fuel must often be mixed and ignited in the exhaust stream in order to burn off the accumulated soot deposits.

Apart from studies directed to after-treatment, there has also been intense interest in the more fundamental issue of how to reduce $NO_x$ and soot generation from the combustion process. Studies in this area relate to shaping combustion chambers and/or modifying the timing, rate, and/or shape of the fuel injection to attain desired effects. One field of study relates to injection premixing methodologies, wherein the object is to attain more complete mixing of fuel and air in order to simultaneously reduce soot and $NO_x$ emissions. In diesel engines, the object of premixing methodologies is to move away from the diffusion burning mechanism which drives diesel combustion, and instead attempt to attain premixed burning. In diffusion burning, the oxidant (fuel) is provided to the oxidizer (air) with mixing and combustion occurring simultaneously. The fuel droplets within an injected spray plume have an outer reaction zone surrounding a fuel core which diminishes in size as it is consumed, and high soot production occurs within the fuel-rich spray core. In contrast, premixed burning mixes fuel and air prior to burning, and the more thorough mixing results in less soot production. Premixing may be performed by a number of different measures, such as by use of fumigation (injection of vaporized fuel into the intake airstream prior to its entry into the engine), and/or direct injection of a fuel charge relatively far before top dead center (TDC) so that piston motion and convection within the cylinder, in combination with the relatively long period of time before TDC (and ignition), result in greater mixing.

One promising diesel premixing technology of this nature is HCCI (Homogeneous Charge Compression Ignition), which has the objective of causing initial ignition of a lean, highly premixed air-fuel mixture at or near top dead center (TDC). An extensive discussion on HCCI and similar premixing techniques is provided in U.S. Pat. No. 6,230,683 to zur Loye et al., and U.S. Pat. Nos. 5,832,880 to Dickey and 6,213,086 to Chmela et al. also contain useful background information. The charge is said to be "homogeneous" in HCCI because it is (at least theoretically) highly and evenly mixed with the air in the cylinder. Ignition is then initiated by autoignition, i.e., thermodynamic ignition via compression heating. The objective of HCCI is to use autoignition of the lean and homogeneous fuel-air mixture to provide a uniform non-diffusion (or minimized diffusion) burn, resulting in significantly lower combustion chamber temperatures and diminished $NO_x$ production (which thrives at high temperature), as well as lower soot production owing to enhanced mixing and the resulting reduction or elimination of fuel-rich regions. In contrast, a richer mixture (such as that necessary for flame propagation from the spark in an SI engine) will burn more quickly at greater temperature, and therefore may result in greater $NO_x$ production.

Another example of a methodology for modifying fuel injection to attain desired combustion results is presented in U.S. Pat. No. 6,526,939 to Reitz et al., wherein multiple injections are used during an engine cycle rather than a single injection (preferably starting at or near the end of the compression stroke), and wherein successive injections experience an increase in their injection pressure (injection rate) and a decrease in the fuel volume injected. This injection scheme is described as promoting lower emissions, possibly owing to better mixing and/or owing to a more controlled heat release from the injected fuel (and thus lower peak temperatures and lower NOx production). Further emissions reductions can be attained with use of EGR or other exhaust after-treatment methodologies.

Despite the advances offered by the foregoing methods, it would be useful to have additional and/or improved emissions reduction methods available, particularly in view of the ever-increasing need for decreased emissions.

SUMMARY OF THE INVENTION

The invention involves fuel injection methods which assist in the reduction of undesirable emissions (e.g., NOx and soot emissions), particularly in diesel engines. To give the reader a basic understanding of some of the advantageous features of the invention, following is a brief summary of preferred versions of the injection methods, with reference being made to the accompanying drawings to assist with the reader's understanding. Since this is merely a summary, it should be understood that more details regarding the preferred versions may be found in the Detailed Description set forth elsewhere in this document. The claims set forth at the end of this document then define the various versions of the invention in which exclusive rights are secured.

Referring to the accompanying FIG. 1, an internal combustion engine 10 and its combustion cycle are schematically depicted, with the engine's piston 12, combustion chamber 14, intake valve(s) 16, exhaust valve(s) 18, and injector(s) 20 being shown in exemplary positions/states at the start of intake, compression, expansion, and exhaust strokes. An adaptive injection strategy is then depicted wherein injection timing, injection pressure, and injected fuel volume is varied between low and greater engine loads, with exemplary low load injection schemes being shown at A and B, and exemplary greater load injection schemes being shown at C and D. An optional high load injection scheme, which might be implemented in lieu of the greater load scheme at high loads, is also shown at E and F.

Referring initially to A and B, fuel is injected during one or more low load injections 100A/100B occurring between the start of the intake stroke and the end of the compression stroke, and which have low injection pressure (preferably less than approximately 50 MPa, with 2-25 MPa injection pressures being most preferred). This injection also preferably occurs (or these injections preferably occur) between the start of the intake stroke (immediately after top dead center) and approximately 40 degrees before top dead center during the compression stroke, with injection timing and injected fuel volume being such that HCCI-type conditions are promoted, i.e., the fuel is highly premixed with the air within the combustion chamber 14 to provide a more homogeneous (and lean) fuel-air charge within the chamber 14. One possible low engine load injection scheme is shown at A in FIG. 1, wherein only a single low load injection 100A is shown. An other possible low engine load injection scheme is shown at B in FIG. 1, wherein multiple low load injections 100B are used. Where multiple low load injections 100B are used, each low load injection after the first low load injection preferably has higher injection pressure than the prior low load injection, in part because cylinder pressure is rising at this time and greater injection pressures are useful to attain the same degree of fuel penetration.

Referring to C and D, a two-stage injection scheme is used over a range of greater engine loads. One or more starting greater load injections 102C/102D are initially made between the start of the intake stroke and the end of the compression stroke, and these are followed by one or more ending greater load injections 104C/104D which occur prior to the end of the expansion stroke. The starting greater load injections 102C/102D, like the low load injections 100A/100B, are intended to create a lean and highly premixed fuel-air charge within the combustion chamber 14. The ending greater load injections 104C/104D are intended to utilize the remaining air within the chamber 14 and generate further work output, while at the same time maintaining combustion and heat release at a controlled rate, avoiding potentially damaging rapid chamber pressure increases, and avoiding the temperature extremes that give rise to NOx production, as well as avoiding the soot that accompanies uneven fuel/air distribution within the chamber 14.

The starting greater load injections 102C/102D may resemble the low load injections 100A/100B, and preferably occur between the start of the intake stroke and approximately 40 degrees before top dead center during the compression stroke. More preferably, the starting greater load injections 102C/102D occur between the start of the intake stroke and the middle of the compression stroke. Where multiple starting greater load injections 102D are used (as at D in FIG. 1), each starting greater load injection 102D after the first starting greater load injection 102D preferably has higher injection pressure than the prior starting greater load injection 102D. As with the low load injections 100A/100B, the starting greater load injections 102C/102D preferably occur at low injection pressures of less than approximately 50 MPa, and most preferably between 2 and 25 MPa.

The ending greater load injections 104C/104D preferably occur after approximately 90 degrees before top dead center during the compression stroke (i.e., midway through compression), and before approximately 90 degrees after top dead center during the expansion stroke (i.e., midway through expansion). Preferably, they begin at or closely adjacent the end of the compression stroke to enhance power output. Each ending greater load injection 104C/104D has higher injection pressure than any of the starting greater load injections 102C/102D (preferably greater than approximately 50 MPa and most preferably above approximately 100 MPa), and lower injected fuel volume than the total injected fuel volume of all starting greater load injections 102C/102D. Additionally, the total injected fuel volume of all ending greater load injections 104C/104D is preferably less than the total injected fuel volume of all starting greater load injections 102C/102D.

As illustrated at D in FIG. 1, the ending greater load injections 104D may include one or more peak injections 106D with greater pressure (and injected fuel volume)—usually situated at or shortly after top dead center at the end of the compression stroke, for greater power output—with any prior or later greater load injections 104D decreasing in injection pressure and fuel volume as these injections are spaced in time from the peak injection(s) 106D. This variation in injection pressure helps attain adequate fuel penetration within the combustion chamber 14, i.e., the injected fuel will traverse the chamber 14 to a sufficient degree that it will more readily reach the available air in the chamber 14 as the gas density within the chamber 14 varies. At the same time, the injection pressure is modified such that the injected fuel does not impinge (or minimally impinges) on the walls of the chamber 14, an effect which adversely affects fuel economy and emissions.

Optionally, the fuel injection scheme may again be altered at the highest range of loads handled by the engine in question. As illustrated at E in FIG. 1, high load injections 108E/108F can be made similarly to the ending greater load injections 104C/104D, with high load injections 108E/108F occurring between approximately 90 degrees before top dead center during the compression stroke (i.e., midway through compression), and before approximately 90 degrees after top dead center during the expansion stroke (i.e., midway through expansion). (However, the high load injections 108E/108F are depicted with slightly greater pressure and duration than the ending greater load injections 104C/104D, reflecting the use of the same or greater amounts of fuel at highest load than that used at lower load.) Most preferably, any high load injections 108E/108F occur after the middle of the compression stroke, most preferably at or closely adjacent the end of the compression stroke. As with the ending greater load injections 104C/104D, the high load injections 108E/108F occur at high injection pressures which are greater than any of the pressures of the starting greater load injections 102C/102D.

The foregoing methodology may include an additional injection 110 which is periodically made for purposes of regenerating exhaust gas after-treatment catalysts in any exhaust after-treatment device provided downstream from the engine, e.g., Lean NOx Traps (LNTs) and/or Diesel Particulate Filters (DPFs). Preferably, this additional regeneration injection 110 is provided as one or more injections having low pressure and low fuel volume, and which are made during the expansion stroke or thereafter, most preferably after the middle of the expansion stroke so that the fuel is well-mixed with exhaust gases for expulsion during the exhaust stroke. If multiple injections are used, successive injections preferably decrease in pressure, again so that the injections achieve good penetration within the cylinder (and subsequently have good mixing), while at the same time having little or no impingement on the walls of the combustion chamber 14. Since after-treatment catalysts only periodically require regeneration, the regeneration injections 110 need not occur every cycle, and can occasionally be made during spaced (non-adjacent) engine cycles.

Beneficially, the foregoing methodology can be implemented in existing engines by modifying their injection systems to accommodate injection at multiple injection pressures during an engine cycle, e.g., by incorporating devices such as intensifier pistons into a common injection rail so that injection pressure can be stepped up when desired, and/or by incorporating multiple rails and/or pressure reservoirs, each having a different pressure.

Further advantages, features, and objects of the invention will be apparent from the remainder of this document in conjunction with the associated drawings.

BRIEF DESCRIPTION OF THE DRAWINGS

FIG. 1 is a diagram illustrating injection curves (plots of injection pressure or rate versus crank angle or time) which exemplify the invention, with different injection schemes being provided at low load (shown at A and B), greater load (shown at C and D), and (optionally) at a highest/greatest load (shown at E and F).

DETAILED DESCRIPTION OF PREFERRED
VERSIONS OF THE INVENTION

Expanding on the foregoing discussion, it should be understood that the injection curves of FIG. 1 are merely exemplary, and the timing of injections, the duration of these injections, the profile shape of each injected charge, and the relative heights (i.e., the relative rates/pressures) for the various injection methods may in practice vary widely. As an example, in place of the depicted single constant pressure low load injection 100A and starting greater load injection 102C, or the multiple increasing-pressure low load injections 100B and starting greater load injections 102D, a single increasing-pressure low load injection might be made, i.e., the profile of the injections 100A and 102C could be modified so that pressure increases over the course of the injection. In similar respects, the profile of each of the injections within 100B and/or 102D could be modified to increase over the course of the injection, and/or the profiles of the injections within 104C and/or 104D and could be modified to first increase, and then decrease over the course of the several injections.

While the foregoing injection methodology could be implemented by two or more injectors 20 within the combustion chamber 14, with each injector 20 supplying fuel at its own discrete pressure (e.g., looking to C in FIG. 1, one injector 20 could supply the injection 102C and another injector 20 could supply the injection 104C), the injections are preferably provided by one or more injectors 20 which can each accommodate variable pressures so that (for example) all of the injections shown in A, B, C, etc. of FIG. 1 can be provided by the same injector(s) 20. Systems for providing multiple pressures from the same injectors are known, for example, from U.S. Pat. No. 6,526,939 to Reitz, Tanabe et al. ("Effect of Fuel Injection Rate Control on Reduction of Emissions and Fuel Consumption in a Heavy Duty DI Diesel Engine", SAE 2005-01-0907), and from other references. The invention can therefore be beneficially adopted within preexisting engines that allow for, or which can be adapted to allow for, injections having different pressures. Thus, preexisting engines may have their injection schemes adapted to provide lower emissions output.

It is emphasized that the injection curves of FIG. 1 are merely exemplary, and a wide variety of different injection curves may be used instead. As partially illustrated by a comparison of the low load injections 100A and 100B, and of the starting greater load injections 102C and 102D, it should be understood that single injections might be replaced with two or more multiple injections, and vice versa. While multiple injections (such as the pulses 100B, 102D, 104C/104D, etc.) have been shown as trains of three injections, fewer or greater numbers of injections might be used, and as partially illustrated by 104C/104D and 108E/108F, they need not have the same injection duration and injection fuel volume (and as discussed above, they may also have pressures which vary over the course of the injection).

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. An injection method for an internal combustion engine wherein an injector injects fuel into a combustion chamber during an engine cycle having intake, compression, expansion, and exhaust strokes, the method including the following steps:
   a. over a low range of engine loads, injecting fuel during a low load injection occurring at a low injection pressure prior to the end of the compression stroke;
   b. over a range of greater engine loads, injecting fuel:
      (1) during one or more starting greater load injections occurring between the start of the intake stroke and the end of the compression stroke; and
      (2) during one or more ending greater load injections occurring prior to the end of the expansion stroke, the ending greater load injections each having:
         (a) higher injection pressure than the injection pressure of any of the starting greater load injections, and
         (b) lower injected fuel volume than the total injected fuel volume of all starting greater load injections.

2. The injection method of claim 1 wherein any starting greater load injection after the first starting greater load injection has greater injection pressure than the first starting greater load injection.

3. The injection method of claim 1 wherein the ending greater load injections collectively have lower injected fuel volume than the total injected fuel volume of all starting greater load injections.

4. The injection method of claim 1 wherein each starting greater load injection begins prior to the middle of the compression stroke.

5. The injection method of claim 4 wherein the ending greater load injections each begin prior to the middle of the expansion stroke.

6. The injection method of claim 1 wherein the ending greater load injections each begin after the middle of the compression stroke.

7. The injection method of claim 6 wherein the ending greater load injections each begin after the end of the compression stroke.

8. The injection method of claim 6 wherein each starting greater load injection begins during the intake stroke or thereafter.

9. The injection method of claim 1 wherein:
   a. the first starting greater load injection occurs between:
      (1) top dead center during the intake stroke, and
      (2) 40 degrees before top dead center during the compression stroke;
   b. all ending greater load injections occur between:
      (1) 90 degrees before top dead center during the compression stroke, and
      (2) 90 degrees after top dead center during the expansion stroke.

10. The injection method of claim 9 wherein the low load injection occurs between:
    a. top dead center during the intake stroke, and
    b. 40 degrees before top dead center during the compression stroke.

11. The injection method of claim 10 further comprising the step of injecting fuel over a high range of engine loads during one or more high load injections occurring between:
    a. 90 degrees before top dead center during the compression stroke, and
    b. 90 degrees after top dead center during the expansion stroke,
    and wherein all high load injections each have higher injection pressure than any of the starting greater load injections.

12. The injection method of claim 1 wherein:
    a. the ending greater load injections:
       (1) occur between the middle of the compression stroke and the middle of the expansion stroke, and
       (2) include one or more peak ending greater load injections;
    b. the ending greater load injections apart from the peak ending greater load injection decrease in injection pressure as these injections are spaced in time from the peak ending greater load injection.

13. The injection method of claim 12 wherein all of the ending greater load injections apart from the peak ending greater load injection have decreasing injected fuel volume with increasing time spacing from the peak ending greater load injection.

14. The injection method of claim 12 wherein the ending greater load injections occur at or closely adjacent the end of the compression stroke.

15. The injection method of claim 1 wherein
    a. each starting greater load injection occurs at a low injection pressure of less than approximately 50 MPa; and
    b. each ending greater load injection occurs at a high injection pressure of greater than approximately 50 MPa.

16. The injection method of claim 15 wherein the low load injection occurs at a low injection pressure of less than approximately 50 MPa.

17. The injection method of claim 1 further comprising the step of injecting fuel over a high range of engine loads during two or more high load injections occurring:
    a. at high injection pressures, and
    b. after the middle of the compression stroke.

18. The injection method of claim 1:
    a. further comprising the step of injecting fuel during a regeneration injection occurring at a low injection pressure after the middle of the expansion stroke,
    b. wherein regeneration injections occur during non-adjacent spaced engine cycles.

19. The injection method of claim 1 further comprising the step of injecting fuel during one or more regeneration injections occurring:
    a. after the middle of the expansion stroke,
    b. prior to the end of the exhaust stroke, and
    c. during non-adjacent spaced engine cycles.

20. The injection method of claim 1 wherein:
    a. the combustion chamber includes one or more injector nozzles therein through which the starting greater load injections and the ending greater load injections are made; and
    b. each injector nozzle making one or more of the starting greater load injections also makes the ending greater load injections.

21. The injection method of claim 1 wherein the internal combustion engine is a diesel engine.

22. The injection method of claim 17 wherein the internal combustion engine is a diesel engine.

23. An injection method for an internal combustion engine wherein an injector injects fuel into a combustion chamber during an engine cycle having intake, compression, expansion, and exhaust strokes, the method including the steps of injecting fuel during multiple injections occurring between the start of the intake stroke and the middle of the expansion stroke, wherein:
    a. any two or more injections starting between the start of the intake stroke and the end of the compression stroke provide each injection after the first injection with greater injection pressure than the prior injection;
    b. any injections starting between the end of the compression stroke and the middle of the expansion stroke:
       (1) each have an injection pressure which is greater than that of any injections starting prior to the end of the compression stroke, and
       (2) collectively have an injected fuel volume which is less than the total injected fuel volume of injections starting prior to the end of the compression stroke.

24. The injection method of claim 23:
    a. wherein the injections starting between the end of the compression stroke and the middle of the expansion stroke include one or more peak injections, and
    b. apart from the peak injections, the injections starting between the end of the compression stroke and the middle of the expansion stroke decrease in injection pressure and injected fuel volume as these injections are spaced in time from the peak high load injection.

25. The injection method of claim 24 wherein the peak injections occur at or immediately adjacent the end of the compression stroke.

26. The injection method of claim 23:
    a. wherein the steps of claim 23 are performed over a range of greater engine loads;
    b. further comprising the steps of performing, over a range of engine loads lower than the intermediate engine loads, the steps of injecting fuel at a low injection pressure during one or more low load injections occurring between the start of the intake stroke and the end of the compression stroke, wherein each such low load injection after the first such low load injection occurs with greater injection pressure than the prior low load injection.

27. An injection method for an internal combustion engine wherein an injector injects fuel into a combustion chamber during an engine cycle having intake, compression, expansion, and exhaust strokes, the method including the following steps:

a. over a low range of engine loads, injecting fuel during one or more low load injections wherein:
     (1) the first low load injection occurs after the start of the intake stroke,
     (2) the final low load injection occurs at or prior to 40 degrees before top dead center during the compression stroke, and
     (3) each low load injection after the first low load injection has higher injection pressure than the prior low load injection;

b. over a range of greater engine loads, injecting fuel during:
     (1) one or more starting greater load injections wherein:
       (a) the first starting greater load injection occurs after the start of the intake stroke;
       (b) the final starting greater load injection occurs at or prior to 40 degrees before top dead center during the compression stroke; and
       (c) each starting greater load injection after the first starting greater load injection has higher injection pressure than the prior starting greater load injection;
     (2) one or more ending greater load injections wherein:
       (a) the first ending greater load injection occurs at or after 90 degrees before top dead center during the compression stroke, and
       (b) the final ending greater load injection occurs at or prior to 180 degrees after top dead center during the expansion stroke;
       (c) each ending greater load injection has higher injection pressure than any of the starting greater load injections;
       (d) each ending greater load injection has lower injected fuel volume than the total injected fuel volume of all starting greater load injections; and
       (e) the total injected fuel volume of all ending greater load injections is less than the total injected fuel volume of all starting greater load injections.

28. The injection method of claim 27 wherein the internal combustion engine is a diesel engine.

* * * * *